United States Patent [19]
Ito et al.

[11] Patent Number: 5,224,185
[45] Date of Patent: Jun. 29, 1993

[54] OPTICAL SWITCH

[75] Inventors: Masumi Ito; Sumio Hoshino; Hiroo Kanamori, all of Yokohama, Japan

[73] Assignee: Sumitomo Electric Industries, Ltd., Osaka, Japan

[21] Appl. No.: 838,689

[22] Filed: Feb. 21, 1992

[30] Foreign Application Priority Data

Feb. 21, 1991 [JP] Japan .................................. 3-27503

[51] Int. Cl.$^5$ .............................................. G02B 6/26
[52] U.S. Cl. ........................................ 385/40; 385/16;
385/41; 385/122; 385/142; 385/143
[58] Field of Search .................... 385/16, 40, 41, 42, 385/50, 122, 142, 143

[56] References Cited

U.S. PATENT DOCUMENTS

| | | | |
|---|---|---|---|
| 4,900,127 | 2/1990 | Robello et al. | 385/141 |
| 4,971,416 | 11/1990 | Khanarian et al. | 385/122 |
| 5,002,361 | 3/1991 | DeMartino et al. | 385/122 |
| 5,079,321 | 1/1992 | Sperling et al. | 385/2 |
| 5,080,962 | 1/1992 | Hench | 428/218 |

FOREIGN PATENT DOCUMENTS 0304051 2/1989 European Pat. Off. .
0353864 2/1990 European Pat. Off. .

Primary Examiner—Frank Gonzalez
Attorney, Agent, or Firm—Cushman, Darby & Cushman

[57] ABSTRACT

An optical switch with improved stability which has a flat waveguide including at least two optical waveguides which are made of a glass containing silica and arranged closely each other, at least a core part of each of the optical waveguides consisting of an amorphous material which is prepared by a sol-gel method and contains organic molecules doped and orientated in a direction of electrostatic field by the application of an electrostatic field, and means for changing an optical path through change of a refractive index of the core part by applying an external force to the core part, which means is provided near the core part.

4 Claims, 3 Drawing Sheets

OPTICAL SWITCH

BACKGROUND OF THE INVENTION

1. Field of the Invention

The present invention relates to an optical switch which can be used in an optical communication system.

2. Description of the Related Art

Hitherto, there is known a waveguide type optical switch comprising a $LiNbO_3$ crystal which has a comparatively large electro-optical effect. A refractive index profile in the waveguide of such optical switch is controlled by applying a voltage between electrodes provided near the waveguide to change an optical path, and such optical switch enables high speed switching in a nano second order.

As a waveguide type optical switch using quartz glass, one utilizing a heat-optical effect is known. This type of the optical switch comprises a thin film heater on the waveguide and utilizes change of a refractive index due to temperature change caused by heating with the thin film heater to effect switching, whereby a response speed in a millisecond order is achieved.

In addition to the above optical switch, optical switches utilizing an acoustic-optical effect, a magneto-optical effect or an optical Karr effect are proposed.

Since the above optical switches are excellent in high speed response, they are promising as an essential element of an optical switchboard. But, they have following problems.

The above optical switches utilize the change of refractive index of a waveguide material caused by the application of an external energy or force such as electricity, heat, elastic wave, magnetism or light onto the waveguide material. The application of external energy or force corresponds to excitation of an energy in the material. Therefore, it is said that each of the above optical switches utilizes a difference between a ground state and an excited state of the material. However, to maintain the excited state of a physical property of the material, the external energy should be applied to the material constantly during a time period in which the excited state should be maintained. That is, to maintain one of the switching states of the above optical switch, the constant external energy or force should be applied to the material.

In addition, sine a chemical structure of the material in the excited state is unstable, it is difficult to maintain the excited state, and a life of the material is greatly shortened in the excited state. Accordingly, the switch which should maintain the one switching state for a long time suffers from unstability for maintaining the excited state.

SUMMARY OF THE INVENTION

An object of the present invention is to provide an optical switch which can stably maintain all switching According to the present invention, there is provided an optical switch comprising:

a flat waveguide which comprises at least two optical waveguides which are made of a glass comprising silica and arranged closely each other, at least a core part of each of said optical waveguides consisting of an amorphous material which is prepared by a sol-gel method and contains organic molecules doped and orientated in a direction of electrostatic field by the application of an electrostatic field, and means for changing an optical path through change of a refractive index of said core part by applying an external force to said core part, which means is provided near said core part.

DETAILED DESCRIPTION OF THE DRAWINGS

When the amorphous material to be used in the present invention in the ground (first) state is excited by the application of the external force, it is changed to another (second) ground state which is different from the first ground (first) state in a short time. The second ground state is stable unlike the excited state. Therefore, the second ground state can be maintained without the continuous application of the external force. When the external force of a different value is applied to the amorphous material in the second ground state, the amorphous material is reversed to the first ground state.

Such material has been known for a long time, but conventional materials have a low response speed. However, the amorphous material to be used in the present invention has a high response speed, so that it can be changed between the first and second ground states in a millisecond order which is practically acceptable.

The amorphous material to be used in the present invention is prepared by synthesizing a silica glass by the sol-gel method in which an organic compound added to a glass-forming raw material and an electrostatic field is applied to the material to orientate molecules of the organic compound in the glass in a direction of the electrostatic field during solidification of a solution.

Figure 4:
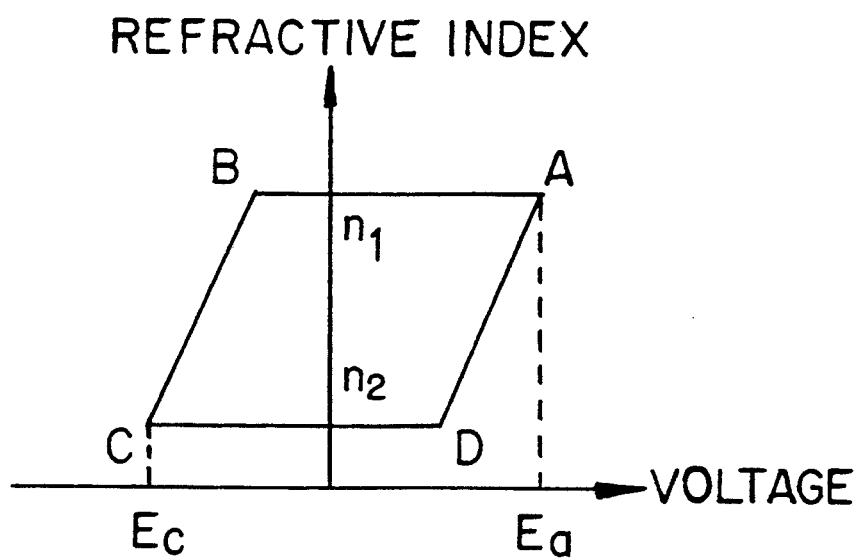
FIG. 4 is a graph illustrating the characteristics of the amorphous material to be used in the present invention.

The property of the amorphous material to be used in the present invention will be explained by making reference to FIG. 4. As shown in FIG. 4, when the voltage $E_A$ is applied to the amorphous material, a refractive index is changed to $n_1$ (the state A). In such state, if the voltage is decreased to 0 (zero), the refractive index $n_1$ is maintained. When the voltage EC is applied to the amorphous material, the refractive index is changed to $n_2$ (from the state B to the state C). In such state, if the voltage is decreased to 0 (zero), the refractive index $n_2$ is maintained.

A cause for such phenomenon may be assumed as follows:

In a state where a voltage is applied, the molecules of the organic compound are changed in the direction of the applied voltage, while in a state where no voltage is applied, the molecules are not rechanged.

The amorphous material to be used in the present invention is prepared by the sol-gel method. Since this method produces an amorphous material from a starting mixture of a metal alkoxide, water and an alcohol at a low temperature, an organic compound which is easily decomposed by heat can be added to the starting mixture and is not decomposed during the preparation. In the sol-gel method, silicon is used as a main metal component in the form of silicon alkoxide (e.g. silicon methoxide, silicon ethoxide, etc.) and a small amount of germanium alkoxide, titanium alkoxide, boron alkoxide or a fluorine compound can be added to control a refractive index of the produced amorphous material, whereby a waveguide structure is easily produced.

In addition to or in place of silicon alkoxide, oxides of boron, aluminum, titanium, zirconium and the like may be used as a main metal component of the amorphous material.

The detailed procedures of the sol-gel method is found, for example in S. P. Mukherjee, "Sol-Gel Processes in Glass Science and Technology", J. Non-Cryst. Solids, 42, (1980) 477–488, the disclosure of which is hereby incorporated by reference.

As the organic compound as a dopant, any organic compound a refractive index of which is changed by the application of the external force can be used. Preferably, an organic compound a refractive index of which is greatly changed by the application of an electric field such as a secondary nonlinear optical material is used. Examples of the nonlinear optical material are p-nitroaniline, 2-methyl-4-nitroaniline, 4-dimethylamino-β-nitrostyrene and the like.

Examples of the organic compound other than the nonlinear optical material are laser dyes, photochromic compounds, photoconductive compounds, etc.

An amount of the dopant organic compound is selected according to the desired properties of the optical switch. For example, 1 to 20% by weight, preferably 5 to 15% by weight of the organic compound is added to the amorphous material.

The optical switch of the present invention has at least two optical waveguides which are closely located. A width or diameter of each core is preferably from 1 to 15 μm, more preferably from 5 to 10 μm. A distance between adjacent two optical waveguides is preferably from 1 to 10 μm, more preferably from 3 to 8 μm.

The means for changing an optical path through change of a refractive index of the core part of the optical waveguide is provided near the core part. A distance between the core part and the means for changing an optical path is preferably from 1 to 5 μm, more preferably from 2 to 4 μm.

The optical waveguide is preferably mounted on a substrate plate made of, for example, quartz glass, multicomponent glass, silicon glass, etc.

PREFERRED EMBODIMENTS OF THE INVENTION

The present invention will be explained further in detail by the following examples.

Figure 1A:
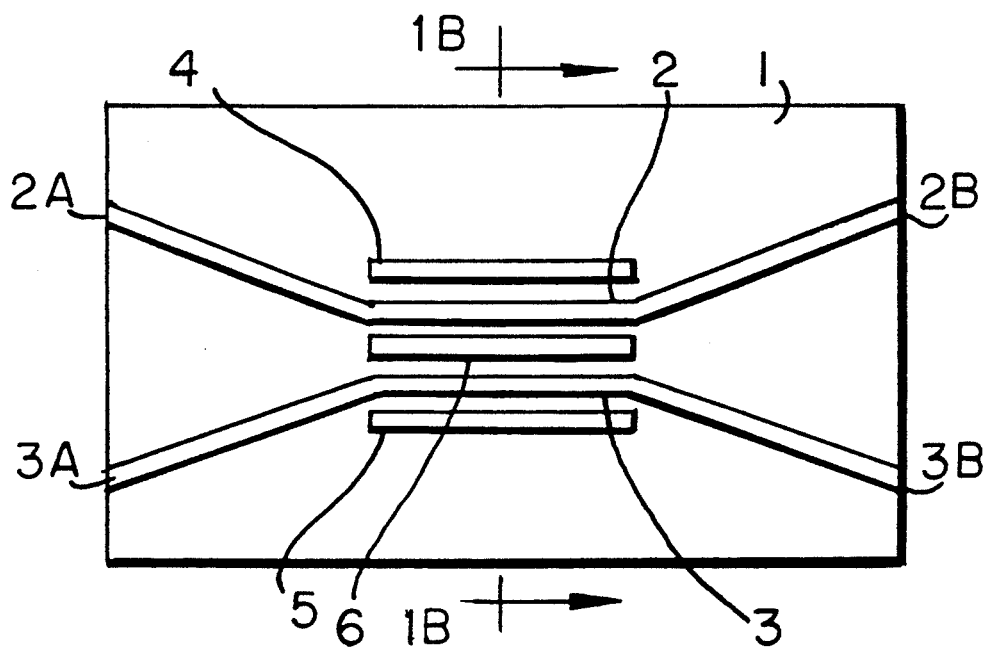
FIGS. 1A and 1B are a plane view and a cross sectional view along the line A—A of an example of the optical switch according to the present invention.
Figure 1B:
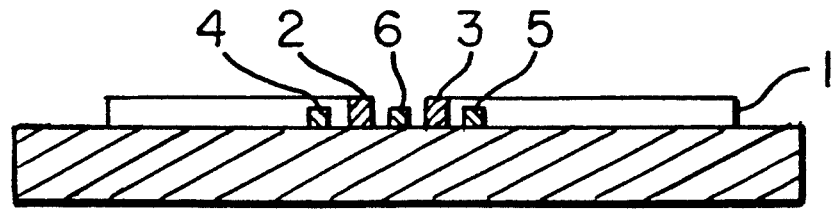

FIGS. 1A and 1B show a plane view of an example of the optical switch of the present invention and its cross sectional view along the line A—A, respectively.

As shown in FIGS. 1A and 1B, the optical switch comprises a substrate plate 1 and two cores 2, 3 each having, at its ends, ports 2a, 2b and 3a, 3b for input and output of light. The two cores are closely located. Each core is made of a p-nitroaniline-doped amorphous material of the present invention. Between the cores 2, 3 and outside the cores, electrodes 4, 5, 6 are provided as the means for changing an optical path.

The method for producing the optical switch of FIG. 1 will be explained by making reference to FIG. 2.

Figure 2A:
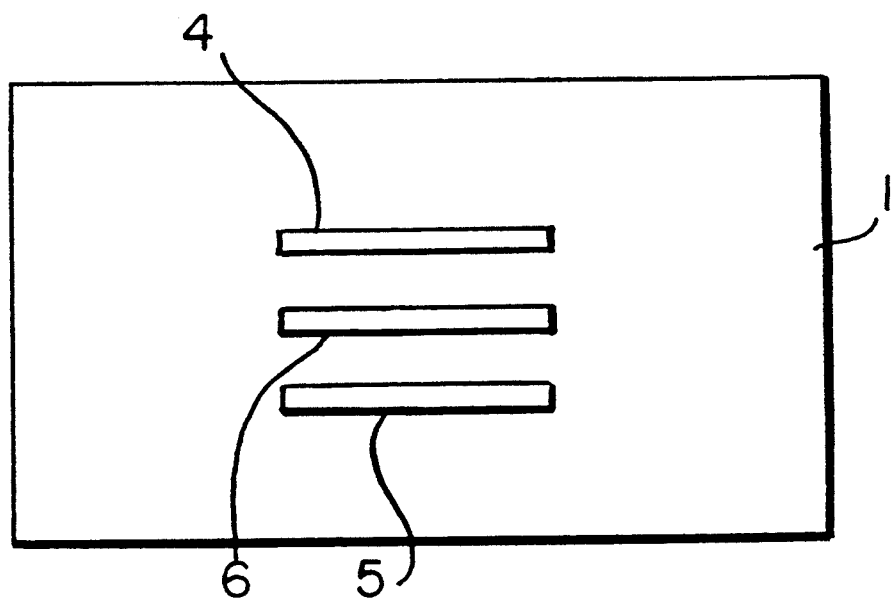
FIGS. 2A and 2B illustrate a method for producing the optical switch of FIG. 1.
Figure 2B:
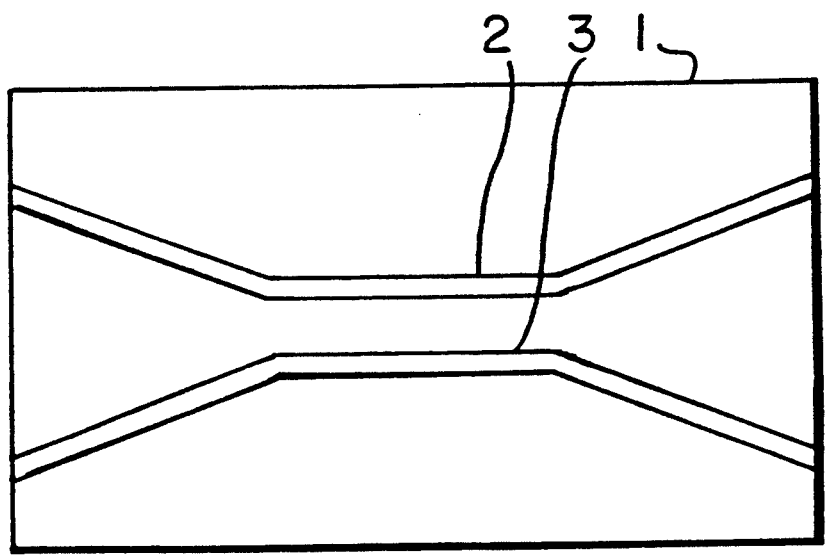

On a surface of a quartz glass plate 1 having a length of about 30 mm and a width of 500 μm, a resist film having three openings each having a size of 10 mm ×5 μm was coated and aluminum electrodes 4, 5, 6 were formed by sputtering (FIG. 2A).

Then, a resist film having a pattern corresponding to the cores 2, 3 was coated. In the pattern, a width of each of the cores 2, 3 was 10 μm, and a distance between the cores 2, 3 is 8 μm at a center part at which the cores are most closely located, and 250 μm at the ends of the port parts. A length of the center part at which the cores are most closely located was 10 mm. Over the resist film, a mixture of silicon methoxide (5 ml), ethanol (10 ml) and water (4 ml) containing 0.2 g of dissolved p-nitroaniline was spin coated to form a thin film.

Using the center electrode 6 for grounding, a direct current of 200V was applied to each of the electrodes 4, 5 to fix the coating film. After complete fixing, the resist film is removed to obtain an optical switch as shown in FIG. 1.

A laser beam was inputted from the port 2a of the optical switch of FIG. 1, and a direct current was applied to the electrodes 4, 5 with varying the voltage from 0V to +10V and then from +10V to −10V during which an amount of light outputted from the ports 2b and 3b were measured. The changes of the light amounts outputted from the ports 2b and 3b are shown in FIG. 3.

Figure 3:
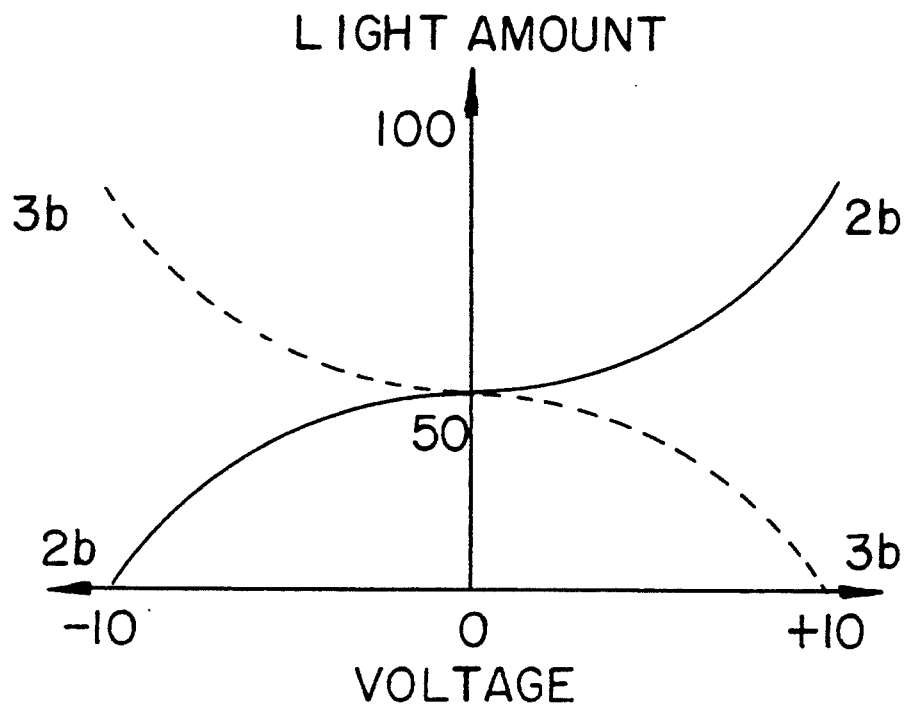
FIG. 3 is a graph showing the changes of the outputted light from the optical switch produced in the example.

As understood from FIG. 3, when no voltage was applied, the amounts of light outputted from the ports 2b and 3b were equal (1:1). When the voltage of +10V was applied, 100% of the light was outputted from the port 2b. This condition was maintained after the application of voltage was stopped. When the voltage of −10V was applied, 100% of the light was outputted from the port 3b. This condition was maintained after the application of voltage was stopped. Such change of the output light was caused by 10 milliseconds application of the voltage.

As explained above, the optical switch of the present invention has a high switching speed and good stability in the switched state and is suitable for use in the optical communication system.

The amorphous material of the present invention can be used in any optical communication part in addition to the optical switch.

What is claimed is:

1. An optical switch comprising:
    a substrate,
    a flat waveguide which comprises at least two optical waveguides which are made of a glass comprising silica and arranged closely to each other, at least a core part of each of said optical waveguides consisting of silica which is prepared by a sol-gel method and contains organic molecules doped and orientated in a direction of electrostatic field by the application of an electrostatic field, and
    means for changing an optical path through change of a refractive index of said core part by applying an external force field to said core part, which means is provided near said core part.

2. The optical switch according to claim 1, wherein said means for changing an optical path is at least one pair of electrodes made of metal thin films.

3. The optical switch according to claim 1, wherein said amorphous material comprises silica and at least one additive selected from the group consisting of titanium, boron, germanium and fluorine.

4. The optical switch according to claim 1, wherein said organic material is a compound having a secondary nonlinear optical effect.

* * * * *